United States Patent
Singh et al.

(10) Patent No.: US 11,555,139 B2
(45) Date of Patent: Jan. 17, 2023

(54) REAL TIME TAILORING OF CEMENT SLURRY FOR DOWNHOLE THICKENING TIME

(71) Applicant: Halliburton Energy Services, Inc., Houston, TX (US)

(72) Inventors: John Paul Bir Singh, Kingwood, TX (US); Siva Rama Krishna Jandhyala, The Woodlands, TX (US); Keith Edward Blaschke, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 9 days.

(21) Appl. No.: 16/923,829

(22) Filed: Jul. 8, 2020

(65) Prior Publication Data

US 2022/0010190 A1    Jan. 13, 2022

(51) Int. Cl.
*C09K 8/467* (2006.01)
*C04B 40/00* (2006.01)
(Continued)

(52) U.S. Cl.
CPC ............ *C09K 8/467* (2013.01); *C04B 28/04* (2013.01); *C04B 40/0032* (2013.01);
(Continued)

(58) Field of Classification Search
CPC ..... C09K 8/467; C04B 28/04; C04B 40/0032; E21B 33/138; E21B 33/14
See application file for complete search history.

(56) References Cited

U.S. PATENT DOCUMENTS

| 5,547,506 A | 8/1996 | Rae et al. |
| 5,570,743 A * | 11/1996 | Padgett .................. B28C 9/004 166/285 |

(Continued)

FOREIGN PATENT DOCUMENTS

| EP | 0741679 | 3/2000 |
| WO | 2016-137628 | 9/2016 |

(Continued)

OTHER PUBLICATIONS

Preece, S., Billingham, J. & King, A. On the initial stages of cement hydration. Journal of Engineering Mathematics 40, 43-58 (2001). https://doi.org/10.1023/A:1017533810329 (Year: 2001).*

(Continued)

*Primary Examiner* — Crystal J. Lee
(74) *Attorney, Agent, or Firm* — Thomas Rooney; C. Tumey Law Group PLLC

(57) ABSTRACT

A method of cementing may include: measuring a feeding rate of water and a feeding rate of cement blend into a cement blender; calculating a cement retarder feeding rate and/or an accelerator feeding rate using a thickening time model, wherein the thickening time model uses at least a thickening time requirement, the feeding rate of water, and the feeding rate of cement blend, to calculate the cement retarder feeding rate and/or the accelerator feeding rate; introducing a cement retarder at the cement retarder feeding rate and/or an accelerator at the accelerator feeding rate into the cement blender; mixing at least the water, cement blend, and at least one of the cement retarder and/or the accelerator in the cement blender to provide a cement slurry; and placing the cement slurry in a wellbore.

20 Claims, 6 Drawing Sheets

(51) Int. Cl.
*C04B 28/04* (2006.01)
*E21B 33/14* (2006.01)
*E21B 33/138* (2006.01)
*C04B 103/12* (2006.01)
*C04B 103/22* (2006.01)

(52) U.S. Cl.
CPC ............ *E21B 33/138* (2013.01); *E21B 33/14* (2013.01); *C04B 2103/12* (2013.01); *C04B 2103/22* (2013.01)

(56) References Cited

U.S. PATENT DOCUMENTS

| | | | |
|---|---|---|---|
| 6,009,419 A | * | 12/1999 | Coveney .............. G01N 33/383 706/16 |
| 7,631,692 B2 | | 12/2009 | Roddy |
| 8,333,240 B2 | | 12/2012 | Roddy |
| 8,609,595 B2 | | 12/2013 | Morgan et al. |
| 8,997,578 B2 | | 4/2015 | Morgan et al. |
| 10,047,270 B2 | | 8/2018 | Pisklak et al. |
| 11,078,400 B2 | | 8/2021 | Pisklak et al. |
| 11,174,198 B2 | | 11/2021 | Morgan et al. |
| 11,198,649 B2 | | 12/2021 | Singh et al. |
| 11,225,595 B2 | | 1/2022 | Jimenez et al. |
| 2003/0217847 A1 | | 11/2003 | Reddy et al. |
| 2010/0212892 A1 | * | 8/2010 | Santra .................... C04B 28/32 166/250.14 |
| 2017/0096874 A1 | | 4/2017 | Parsons et al. |
| 2017/0167223 A1 | | 6/2017 | James et al. |
| 2017/0364607 A1 | * | 12/2017 | Kaushik .............. C04B 40/0032 |
| 2019/0026167 A1 | | 1/2019 | Gerweck et al. |
| 2019/0026168 A1 | | 1/2019 | Qiu et al. |
| 2019/0026171 A1 | | 1/2019 | Lea et al. |
| 2019/0026172 A1 | | 1/2019 | Wu et al. |
| 2019/0026175 A1 | | 1/2019 | Shelke et al. |
| 2019/0026176 A1 | | 1/2019 | Ganapathy et al. |
| 2019/0026177 A1 | | 1/2019 | Damron et al. |
| 2019/0026179 A1 | | 1/2019 | Araki et al. |
| 2019/0026180 A1 | | 1/2019 | Wong et al. |
| 2019/0330513 A1 | | 10/2019 | Jimenez et al. |
| 2019/0358853 A1 | | 11/2019 | Morgan et al. |
| 2019/0367796 A1 | | 12/2019 | Pisklak et al. |
| 2019/0367797 A1 | | 12/2019 | Morgan et al. |
| 2020/0332172 A1 | | 10/2020 | Pisklak et al. |
| 2020/0332643 A1 | | 10/2020 | Pisklak et al. |
| 2020/0333318 A1 | | 10/2020 | Benkley et al. |
| 2021/0147305 A1 | | 5/2021 | Singh et al. |
| 2021/0147742 A1 | | 5/2021 | Pearl et al. |
| 2021/0171405 A1 | | 6/2021 | Singh et al. |
| 2021/0171407 A1 | | 6/2021 | Singh et al. |
| 2021/0172280 A1 | | 6/2021 | Singh et al. |

FOREIGN PATENT DOCUMENTS

| | | |
|---|---|---|
| WO | 20180156114 | 8/2018 |
| WO | 20180156116 | 8/2018 |
| WO | 20180156124 | 8/2018 |

OTHER PUBLICATIONS

U.S. Appl. No. 16/923,752, filed Jul. 8, 2020.
U.S. Appl. No. 16/923,797, filed Jul. 8, 2020.
U.S. Appl. No. 16/923,864, filed Jul. 8, 2020.
U.S. Appl. No. 16/923,897, filed Jul. 8, 2020.
Umeokafor, C. V., & Joel, O. F. (2010). Modeling of Cement Thickening Time at High Temperatures With Different Retarder Concentrations. Nigeria Annual International Conference and Exhibition.

* cited by examiner

REAL TIME TAILORING OF CEMENT SLURRY FOR DOWNHOLE THICKENING TIME

BACKGROUND

In well cementing, such as well construction and remedial cementing, cement compositions are commonly utilized. Cement slurries may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement slurry may be pumped into an annulus between the walls of the well bore and the exterior surface of the pipe string disposed therein. The cement slurry may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement slurries also may be used in remedial cementing methods, for example, to seal cracks or holes in pipe strings or cement sheaths, to seal highly permeable formation zones or fractures, to place a cement plug, and the like.

A particular challenge in well cementing is the development of satisfactory placement and mechanical properties, including thickening time, in a cement slurry within a reasonable time period after placement in the subterranean formation. Oftentimes several cement slurries with varying additives are tested to see if they meet the material engineering requirements for a particular well. The process of selecting the components of the cement slurry are usually done by a best guess approach by utilizing previous slurries and modifying them until a satisfactory solution is reached. The process may be time consuming and the resulting slurry may be complex. Furthermore, the cement components available in any one particular region may vary in slurry from those of another region thereby further complicating the process of selecting a correct slurry.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1:
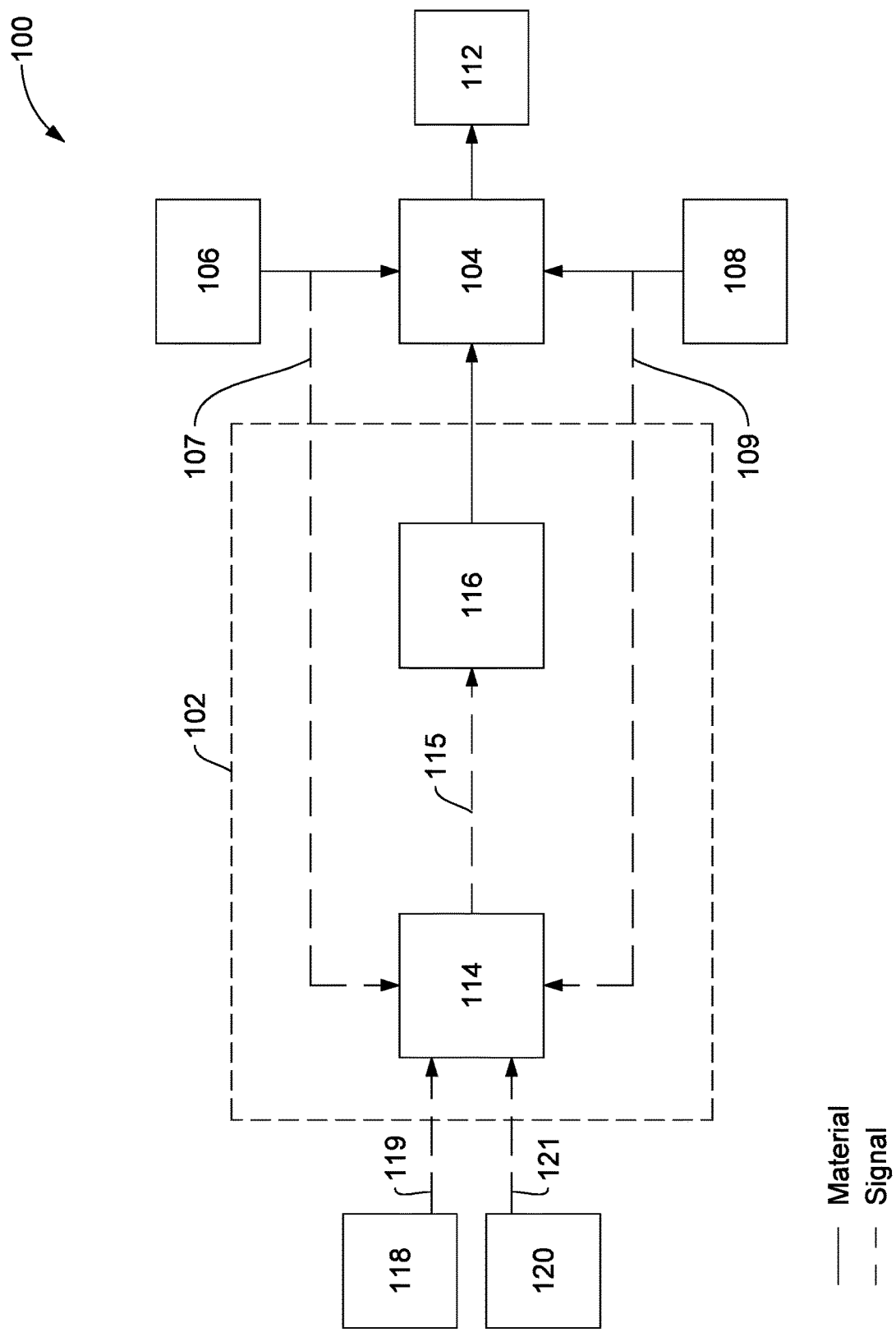
FIG. 1 illustrates a system to design for thickening time.

The present disclosure may generally relate to cementing methods and systems. More particularly, embodiments may be directed to designing cement slurries based at least partially on a thickening time model.

Cement slurries may contain cement, supplementary cementitious additives, inert materials, and chemical additives. A cement slurry for use in cementing wellbores is typically mixed at a wellbore pad site using cement mixing equipment and pumped into the wellbore using cement pumps. After the cement slurry is mixed, there is a time lag between when the cement is in a liquid state and when the cement begins to set. As the cement slurry begins to set, the slurry gradually becomes more viscous until fully set. There may be an upper limit of viscosity beyond which the cement slurry becomes too viscous to pump. In general, the upper limit of viscosity is typically defined to be when the fluid has a consistency of greater than 70 Bearden units of consistency ("Bc"). However, there may be other considerations where the cement slurry would be considered unpumpable and thus a Bc value of 30, 50, 70, 100, or any other value may be selected as being "unpumpable." To determine the consistency or Bc value of a cement slurry, an atmospheric or a pressurized consistometer may be used in accordance with the procedure for determining cement thickening times set forth in API RP Practice 10B-2, *Recommended Practice for Testing Well Cements*, First Edition, July 2005. The time to reach the selected Bearden units of consistency is reported as thickening time. It is often a design criteria for a cement slurry to have a long enough thickening time such that there is enough time to pump the required volume of cement into the wellbore while also not having too long of a thickening time where there is excessive downtime from waiting on the cement to set. The thickening time for a cement slurry may be a function of pressure, temperature, density of the cement slurry, and composition of the cement slurry.

Thickening time is an important characteristic of wellbore cement designs and may influence whether the cementing job is successful or if remedial cementing operations may be required. One factor which influences the thickening time is temperature which is typically not a constant value when cementing in wellbores. Oftentimes the temperature profile of a wellbore is variant with downhole position, yet the current practice of determining thickening times is to use a high pressure high temperature (HPHT) consistometer and apply a linearly ramped temperature profile which begins at room temperature up to the bottom hole circulating temperature (BHCT). Using the consistometer method for thickening time gives one value of thickening time. However, in reality the cement slurry will exhibit a range of thickening times. For example, the first barrel of cement pumped into the wellbore may have a different thickening time compared to the last barrel pumped into the wellbore depending on the temperature profile experienced by each barrel. The result of this uncertainty in thickening time often leads to cement slurries with relatively large safety margins and the thickening time often exceeds the expected placement time.

Designing a cement slurry to have a desired thickening time is an inefficient trial and error process often requiring multiple iterations of selecting slurry components and mass fractions thereof and testing a thickening time for a slurry formed form the slurry components. Small changes in composition may result in widely varying thickening times which is further compounded by cementitious materials varying across different geographical areas. As such, a cement recipe that is prepared in one region may have a different thickening time than the same recipe prepared in a different region due to the differences in minerology and manufacturing processes of the cement components. The differences in thickening times may be difficult to predict as the thickening time of a cement slurry is a complex function of various interacting factors.

Cement slurries are typically blended with chemical additives such as accelerators, retarders, fluid loss control additives, lost circulation additives, rheological modifiers, and other chemical additives to impart desirable properties on the cement slurry such as fluid loss control, rheology, stability, and thickening time. The additive package that can satisfy all of these properties is typically determined through an iterative process. This is because one additive used to satisfy one property may affect another property. For example, a fluid loss control additive may retard the cement slurry. Thus, when designing for thickening time, the effects of each additive on thickening time must be accounted for.

Cement compositions are often designed on laboratory scale to select the type and amounts of cement, supplementary cementitious additives, and chemical additives to meet the engineering requirements of the cement. The cement design that is developed in the laboratory may be sent to a cement bulk plant where the components of the cement are blended together in the amounts set out in the cement design. The product "dry blend" or simply, cement blend, may then be transported to a well pad where the cement blend is mixed with water to form a cement slurry and pumped into a wellbore. Once the cement blend is made at the bulk plant, there is no real time control over the slurry composition. The only variable that is controlled at the rig site is the density of the slurry composition. There are several operational challenges associated with bulk blending of cements based on laboratory scale designs. Bulk blending of cements is an inherently inhomogeneous process which may result in a cement slurry with disparate properties depending on which particular sack of cement is being mixed with water. To avoid deliver of sack issues, samples of a cement blend may be taken at the bulk plant which necessitates further laboratory testing to verify the cement design.

Cement retarders and accelerators are often included in cement compositions to modify the thickening time. The retarder and/or accelerator concentration is set by the bulk plant cement blend, as explained above, and in principle should be a constant value if the cement blend is homogeneous. However, the additive concentration may vary throughout the pumping time which may lead to varying thickening times of the cement slurry which deviate from the designed thickening time. Further, the laboratory methods of calculating thickening time based on a single value of estimated temperature (BHCT) are not an accurate representation of the actual non-monotonic temperature profile that a cement slurry will experience during pumping and setting. As discussed above, the wellbore temperature is a component of thickening time, so the first barrel of cement introduced into a wellbore will have a different thickening time than the last barrel of cement due to the difference in temperature experience by the first and last barrel.

Disclosed herein are methods and systems for cementing, and in some examples, to methods and systems for cementing using a thickening time model to determine a concentration of a retarder and/or accelerator to add to a cement slurry in real time to meet a thickening time requirement. The methods disclosed herein may utilize real time data of volume and flow rate of water, amount and composition of the cement blend, and downhole temperature of the wellbore. The method may utilize a model to calculate the required amount of retarder and/or accelerator to be added in real time to the cement slurry before the cement slurry is pumped into the wellbore. Some examples may include a control system which takes as input real time data of volume and flow rate of water, amount and composition of the cement blend, and downhole temperature of the wellbore and utilize a thickening time model to determine a required concentration of retarder and/or accelerator which may then be automatically added to the cement slurry in real time. The methods and systems disclosed herein allow for controlling the thickening time of the cement slurry in real time during pumping.

The methods and systems disclosed herein may have several advantages, only some of which may be detailed herein. Real time delivery of retarder and/or accelerator provides a mechanism to control thickening time of the cement slurry based on where in the wellbore a particular barrel of cement is to be placed. The methods presented herein can readily be adapted to take into account the complete temperature and/or pressure profile a cement barrel may experience under downhole conditions. As will be discussed below, wellbore temperature may be measured in real time, such as by downhole tools, to more accurately predict the thickening time. The method provides an effective way to account for the dynamic temperature profile experienced by each barrel of cement and its required thickening time. The delivery mechanism allows for optimizing retarder concentration for each barrel of cement delivered downhole which may allow for less retarder to be used overall. The methods may also reduce non-productive wait on cement time as the thickening time can be tailored in real time to pump time which saves rig time. The methods and systems disclosed herein may also form part of a larger automated cementing system.

A required concentration of retarder and/or accelerator for a thickening time may be written as a mathematical function of various factors as shown in equation 1.

$$[A]=f(TT_{reqd}, T_{dh}, P_{dh}, \rho_s, C_{bl})$$ Equation 1

Where [A] is the required concentration of retarder and/or accelerator, $TT_{reqd}$ is the required thickening time, $T_{dh}$ is the downhole temperature profile, $P_{dh}$ is the downhole pressure profile, $\rho_s$ is the density of the slurry, and $C_{bl}$ is the composition of the cement blend. As used herein, cement composition and cement blend may be used interchangeably. In general, each of the components of Equation 1 may be a function of time as shown in Equation 2.

$$[A](t)=f(TT_{reqd}(t), T_{dh}(t), P_{dh}(t), \rho_s(t), C_{bl}(t))$$ Equation 2

Where [A](t) is the required concentration of retarder and/or accelerator, $TT_{reqd}(t)$ is the required thickening time as a function of time, $T_{dh}(t)$ is the downhole temperature profile as a function of time, $P_{dh}(t)$ is the downhole pressure profile as a function of time, $\rho_s(t)$ is the density of the slurry as a function of time, and CO) is the composition of the cement slurry as a function of time.

In some examples, the relationship between the concentration of retarder and/or activator and other variables may not be an explicit equation as shown by equation 1, but rather that the relationship may be implicit. For example, the relationship between retarder concentration and other variables may be expressed as an integral equation such as equation 3.

$$1 = \int_0^t \frac{dt}{TT(T_{dh}(t), P_{dh}(t), \rho_s(t), C_{bl}(t), [A](t))}$$ Equation 3

Where thickening time is a function of time (t), $T_{dh}(t)$ is a temperature downhole as a function of time, $P_{dh}(t)$ is a pressure in the wellbore as a function of time, $\rho_s(t)$ is density of the cement slurry as a function of time, $C_{bl}(t)$ is the composition of the cement slurry as a function of time, and [A](t) is a concentration of the retarder/accelerator required as a function of time. The thickening time of the cement slurry may be found as a solution to the integral equation. Equation 3 allows evaluation of a time-dependent temperature of thickening time as well as time-dependent conditions of pressure, density, and composition.

There may be several equivalent forms of the denominator of equation 3. One form of the denominator is shown in Equation 4.

$$TT(T_{dh}(t), P_{dh}(t), \rho_s(t), C_{bl}(t), [A](t)) = TT_0$$

$$\exp\left(-\frac{E}{R}\left(\frac{1}{T_{ref}} - \frac{1}{T(t)}\right)\right) \exp\left(\frac{-VP(t)}{RT_{ref}}\right) \exp(\alpha[A](t)) \left(\frac{W(t)}{C_{bl}(t)}\right)^n$$

Equation 4

Where $TT_0$ is characteristic thickening time at a reference temperature, E is the activation energy, R is the universal gas constant, $T_{ref}$ is a reference temperature which $TT_0$ is measured and or calculated at, T(t) is temperature as a function of time, V is the activation volume, P(t) is pressure as a function of time, $\alpha$ is a potency of the additive such as retarder, [A](t) is concentration of the additive(s) as a function of time, W(t) is the mass fraction of water in the cement slurry as a function of time, $C_{bl}(t)$ is the mass fraction of cement blend in the cement slurry as a function of time, and n is a constant indicating sensitivity of thickening time to amount of water. Equation 4 illustrates one thickening time model but there may be many equivalent thickening time models, depending for example on the composition of the cement slurry. A thickening time model may include two main components, a component that models thickening time of the blend of cementitious components, and a component that models thickening time of cement additives.

Another form of the denominator of equation 3 is Equation 5.

$$TT(T_{dh}(t), P_{dh}(t), \rho_s(t), C_{bl}(t), [R](t)) \propto$$

$$f_1(T) * f_2(P) * f_3([A]) * f_4\left(\frac{W}{C}\right) * f_5(C_{bl})$$

Equation 5

Where f1, f2, f3, f4, and f5 are functions which may be transcendental equations such as power law, exponential, logarithmic, trigonometric, or a combination thereof.

FIG. 1 illustrates a system 100 which implements the models of thickening time discussed above. FIG. 1 also illustrates one method of using the models of thickening time discussed to determine an amount of retarder and/or activator to add in real time to meet a thickening time requirement. As illustrated in FIG. 1, cement blender 104 may receive water from water source 106 and cement blend from cement source 108 and blend a cement slurry which is pumped into wellbore 112. The cement blend may or may not include a cement retarder and/or accelerator. System 100 may include an additive selection system 102 which may utilize a thickening time model 114 to select a concentration of a retarder and/or accelerator which may be as an input to additive unit 116 which may provide the additive in the selected concentration to cement blender 104.

Thickening time model 114 may be any of the previously disclosed thickening time models or any derivatives thereof. In block 118 a downhole temperature profile may be defined which may be an input to thickening time model 114 as shown by signal 119. The downhole temperature profile may be from any source such as a well log or downhole tool such as fiber optic line, or a real time model of the wellbore temperature, for example. In block 120 a target thickening time may be defined. A volumetric or mass flow rate of water flowing into cement blender 104 may be measured and used as an input to thickening time model 114 as shown by signal 107. Additionally, a volumetric or mass flow rate of cement blend flowing into cement blender 104 may be measured and used as an input to thickening time model 114 as shown by signal 109.

Thickening time model 114 may be used to calculate a required additive and/or retarder in response to the target thickening time defined in block 120 such that the retarder concentration in the cement slurry pumped into wellbore 112 may be controlled in real time and in response to wellbore conditions and material flow rates into cement blender 104. As discussed above, the target thickening time may be constant or may be time-dependent which may necessitate the concentration of a retarder and/or accelerator to also be time-variant to meet the time-dependent target thickening time. An output from thickening time model 114 may cause a control system (not illustrated) to generate a signal 115 that causes additive unit 116 to provide a retarder and/or accelerator to cement blender 104 in the concentration calculated by thickening time model 114.

Cement compositions described herein may generally include a hydraulic cement and water. A variety of hydraulic cements may be utilized in accordance with the present disclosure, including, but not limited to, those comprising calcium, aluminum, silicon, oxygen, iron, and/or sulfur, which set and harden by reaction with water. Suitable hydraulic cements may include, but are not limited to, Portland cements, pozzolana cements, gypsum cements, high alumina content cements, silica cements, and any combination thereof. In certain examples, the hydraulic cement may include a Portland cement. In some examples, the Portland cements may include Portland cements that are classified as Classes A, C, H, and G cements according to American Petroleum Institute, *API Specification for Materials and Testing for Well Cements*, API Specification 10, Fifth Ed., Jul. 1, 1990. In addition, hydraulic cements may include cements classified by American Society for Testing and Materials (ASTM) in C150 (Standard Specification for Portland Cement), C595 (Standard Specification for Blended Hydraulic Cement) or C1157 (Performance Specification for Hydraulic Cements) such as those cements classified as ASTM Type I, II, or III. The hydraulic cement may be included in the cement composition in any amount suitable for a particular composition. Without limitation, the hydraulic cement may be included in the cement compositions in an amount in the range of from about 10% to about 80% by weight of cement blend in the cement composition. For example, the hydraulic cement may be present in an amount ranging between any of and/or including any of about 10%, about 15%, about 20%, about 25%, about 30%, about 35%, about 40%, about 45%, about 50%, about 55%, about 60%, about 65%, about 70%, about 75%, or about 80% by weight of the cement compositions.

The water may be from any source provided that it does not contain an excess of compounds that may undesirably affect other components in the cement compositions. For example, a cement composition may include fresh water or saltwater. Saltwater generally may include one or more dissolved salts therein and may be saturated or unsaturated as desired for a particular application. Seawater or brines may be suitable for use in some examples. Further, the water may be present in an amount sufficient to form a pumpable slurry. In certain examples, the water may be present in the cement composition in an amount in the range of from about 33% to about 200% by weight of the cementitious materials. For example, the water cement may be present in an amount ranging between any of and/or including any of about 33%, about 50%, about 75%, about 100%, about 125%, about 150%, about 175%, or about 200% by weight of the cementitious materials. The cementitious materials referenced may include all components which contribute to the compressive strength of the cement composition such as the hydraulic cement and supplementary cementitious materials, for example.

As mentioned above, the cement composition may include supplementary cementitious materials. The supplementary cementitious material may be any material that contributes to the compressive strength of the cement composition. Some supplementary cementitious materials may include, without limitation, fly ash, blast furnace slag, silica fume, pozzolans, kiln dust, and clays, for example. Although only some supplementary cementitious materials are disclosed herein, one of ordinary skill in the art, with the benefit of this disclosure, should be able to readily recognize if a material may be suitable to include in a cement composition as a supplementary cementitious material.

The cement composition may include kiln dust as a supplementary cementitious material. "Kiln dust," as that term is used herein, refers to a solid material generated as a by-product of the heating of certain materials in kilns. The term "kiln dust" as used herein is intended to include kiln dust made as described herein and equivalent forms of kiln dust. Depending on its source, kiln dust may exhibit cementitious properties in that it can set and harden in the presence of water. Examples of suitable kiln dusts include cement kiln dust, lime kiln dust, and combinations thereof. Cement kiln dust may be generated as a by-product of cement production that is removed from the gas stream and collected, for example, in a dust collector. Usually, large quantities of cement kiln dust are collected in the production of cement that are commonly disposed of as waste. The chemical analysis of the cement kiln dust from various cement manufactures varies depending on a number of factors, including the particular kiln feed, the efficiencies of the cement production operation, and the associated dust collection systems. Cement kiln dust generally may include a variety of oxides, such as $SiO_2$, $Al_2O_3$, $Fe_2O_3$, CaO, MgO, $SO_3$, $Na_2O$, and $K_2O$. The chemical analysis of lime kiln dust from various lime manufacturers varies depending on several factors, including the particular limestone or dolomitic limestone feed, the type of kiln, the mode of operation of the kiln, the efficiencies of the lime production operation, and the associated dust collection systems. Lime kiln dust generally may include varying amounts of free lime and free magnesium, lime stone, and/or dolomitic limestone and a variety of oxides, such as $SiO_2$, $Al_2O_3$, $Fe_2O_3$, CaO, MgO, $SO_3$, $Na_2O$, and $K_2O$, and other components, such as chlorides. A cement kiln dust may be added to the cement composition prior to, concurrently with, or after activation. Cement kiln dust may include a partially calcined kiln feed which is removed from the gas stream and collected in a dust collector during the manufacture of cement. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$. The CKD and/or lime kiln dust may be included in examples of the cement composition in an amount suitable for a particular application.

In some examples, the cement composition may further include one or more of slag, natural glass, shale, amorphous silica, or metakaolin as a supplementary cementitious material. Slag is generally a granulated, blast furnace by-product from the production of cast iron including the oxidized impurities found in iron ore. The cement may further include shale. A variety of shales may be suitable, including those including silicon, aluminum, calcium, and/or magnesium. Examples of suitable shales include vitrified shale and/or calcined shale. In some examples, the cement composition may further include amorphous silica as a supplementary cementitious material. Amorphous silica is a powder that may be included in embodiments to increase cement compressive strength. Amorphous silica is generally a byproduct of a ferrosilicon production process, wherein the amorphous silica may be formed by oxidation and condensation of gaseous silicon suboxide, SiO, which is formed as an intermediate during the process In some examples, the cement composition may further include a variety of fly ashes as a supplementary cementitious material which may include fly ash classified as Class C, Class F, or Class N fly ash according to American Petroleum Institute, API Specification for Materials and Testing for Well Cements, API Specification 10, Fifth Ed., Jul. 1, 1990. In some examples, the cement composition may further include zeolites as supplementary cementitious materials. Zeolites are generally porous alumino-silicate minerals that may be either natural or synthetic. Synthetic zeolites are based on the same type of structural cell as natural zeolites and may comprise aluminosilicate hydrates. As used herein, the term "zeolite" refers to all natural and synthetic forms of zeolite.

Where used, one or more of the aforementioned supplementary cementitious materials may be present in the cement composition. For example, without limitation, one or more supplementary cementitious materials may be present in an amount of about 0.1% to about 80% by weight of the cement composition. For example, the supplementary cementitious materials may be present in an amount ranging between any of and/or including any of about 0.1%, about 10%, about 20%, about 30%, about 40%, about 50%, about 60%, about 70%, or about 80% by weight of the cement.

In some examples, the cement composition may further include hydrated lime. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included in examples of the cement composition, for example, to form a hydraulic composition with the supplementary cementitious components. For example, the hydrated lime may be included in a supplementary cementitious material-to-hydrated-lime weight ratio of about 10:1 to about 1:1 or 3:1 to about 5:1. Where present, the hydrated lime may be included in the set cement composition in an amount in the range of from about 10% to about 100% by weight of the cement composition, for example. In some examples, the hydrated lime may be present in an amount ranging between any of and/or including any of about 10%, about 20%, about 40%, about 60%, about 80%, or about 100% by weight of the cement composition. In some examples, the cementitious components present in the cement composition may consist essentially of one or more supplementary cementitious materials and the hydrated lime. For example, the cementitious components may primarily comprise the supplementary cementitious materials and the hydrated lime without any additional components (e.g., Portland cement, fly ash, slag cement) that hydraulically set in the presence of water.

Lime may be present in the cement composition in several forms, including as calcium oxide and or calcium hydroxide or as a reaction product such as when Portland cement reacts with water. Alternatively, lime may be included in the cement composition by amount of silica in the cement composition. A cement composition may be designed to have a target lime to silica weight ratio. The target lime to silica ratio may be a molar ratio, molar ratio, or any other equivalent way of expressing a relative amount of silica to lime. Any suitable target time to silica weight ratio may be selected including from about 10/90 lime to silica by weight to about 40/60 lime to silica by weight. Alternatively, About 10/90 lime to silica by weight to about 20/80 lime to silica by weight, about 20/80 lime to silica by weight to about 30/70 lime to silica by weight, or about 30/70 lime to silica by weight to about 40/63 lime to silica by weight.

Other additives suitable for use in subterranean cementing operations also may be included in embodiments of the cement composition. Examples of such additives include, but are not limited to: weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. In embodiments, one or more of these additives may be added to the cement composition after storing but prior to the placement of a cement composition into a subterranean formation. In some examples, the cement composition may further include a dispersant. Examples of suitable dispersants include, without limitation, sulfonated-formaldehyde-based dispersants (e.g., sulfonated acetone formaldehyde condensate) or polycarboxylated ether dispersants. In some examples, the dispersant may be included in the cement composition in an amount in the range of from about 0.01% to about 5% by weight of the cementitious materials. In specific examples, the dispersant may be present in an amount ranging between any of and/or including any of about 0.01%, about 0.1%, about 0.5%, about 1%, about 2%, about 3%, about 4%, or about 5% by weight of the cementitious materials.

In some examples, the cement composition may further include a set retarder. A broad variety of set retarders may be suitable for use in the cement compositions. For example, the set retarder may comprise phosphonic acids, such as ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or terpolymers comprising sulfonate and carboxylic acid groups such as sulfonate-functionalized acrylamide-acrylic acid copolymers; borate compounds such as alkali borates, sodium metaborate, sodium tetraborate, potassium pentaborate; derivatives thereof, or mixtures thereof. Examples of suitable set retarders include, among others, phosphonic acid derivatives. Generally, the set retarder may be present in the cement composition in an amount sufficient to delay the setting for a desired time. In some examples, the set retarder may be present in the cement composition in an amount in the range of from about 0.01% to about 10% by weight of the cementitious materials. In specific examples, the set retarder may be present in an amount ranging between any of and/or including any of about 0.01%, about 0.1%, about 1%, about 2%, about 4%, about 6%, about 8%, or about 10% by weight of the cementitious materials.

In some examples, the cement composition may further include an accelerator. A broad variety of accelerators may be suitable for use in the cement compositions. For example, the accelerator may include, but are not limited to, aluminum sulfate, alums, calcium chloride, calcium nitrate, calcium nitrite, calcium formate, calcium sulphoaluminate, calcium sulfate, gypsum-hemihydrate, sodium aluminate, sodium carbonate, sodium chloride, sodium silicate, sodium sulfate, ferric chloride, or a combination thereof. In some examples, the accelerators may be present in the cement composition in an amount in the range of from about 0.01% to about 10% by weight of the cementitious materials. In specific examples, the accelerators may be present in an amount ranging between any of and/or including any of about 0.01%, about 0.1%, about 1%, about 2%, about 4%, about 6%, about 8%, or about 10% by weight of the cementitious materials.

Cement compositions generally should have a density suitable for a particular application. By way of example, the cement composition may have a density in the range of from about 8 pounds per gallon ("ppg") (959 kg/m$^3$) to about 20 ppg (2397 kg/m$^3$), or about 8 ppg to about 12 ppg (1437. kg/m$^3$), or about 12 ppg to about 16 ppg (1917.22 kg/m$^3$), or about 16 ppg to about 20 ppg, or any ranges therebetween. Examples of the cement compositions may be foamed or unfoamed or may comprise other means to reduce their densities, such as hollow microspheres, low-density elastic beads, or other density-reducing additives known in the art.

The cement slurries disclosed herein may be used in a variety of subterranean applications, including primary and remedial cementing. The cement slurries may be introduced into a subterranean formation and allowed to set. In primary cementing applications, for example, the cement slurries may be introduced into the annular space between a conduit located in a wellbore and the walls of the wellbore (and/or a larger conduit in the wellbore), wherein the wellbore penetrates the subterranean formation. The cement slurry may be allowed to set in the annular space to form an annular sheath of hardened cement. The cement slurry may form a barrier that prevents the migration of fluids in the wellbore. The cement composition may also, for example, support the conduit in the wellbore. In remedial cementing applications, the cement compositions may be used, for example, in squeeze cementing operations or in the placement of cement plugs. By way of example, the cement compositions may be placed in a wellbore to plug an opening (e.g., a void or crack) in the formation, in a gravel pack, in the conduit, in the cement sheath, and/or between the cement sheath and the conduit (e.g., a micro annulus).

Figure 2:
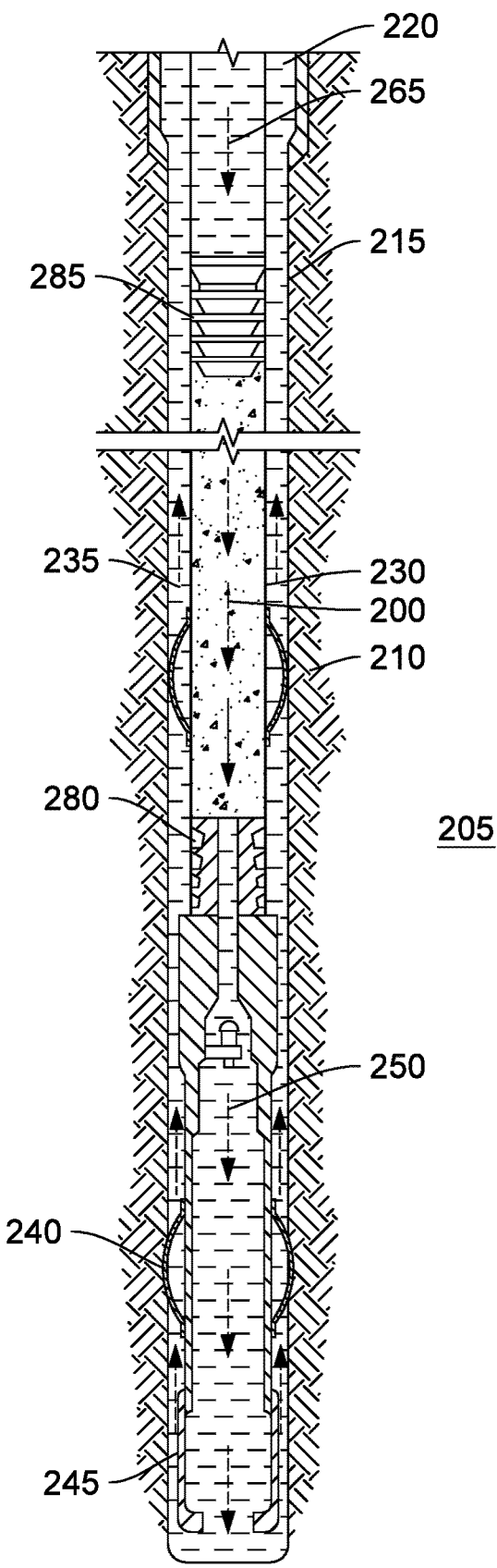
FIG. 2 illustrates introduction of a cement slurry into a wellbore.

Reference is now made to FIG. 2, illustrating use of a cement slurry 200. Cement slurry 200 may comprise any of the components described herein. Cement slurry 200 may be designed, for example, using the thickening time models describe herein. Cement slurry 200 may be placed into a subterranean formation 205 in accordance with example systems, methods, and cement slurries. As illustrated, a wellbore 210 may be drilled into the subterranean formation 205. While wellbore 210 is shown extending generally vertically into the subterranean formation 205, the principles described herein are also applicable to wellbores that extend at an angle through the subterranean formation 205, such as horizontal and slanted wellbores. As illustrated, the wellbore 210 comprises walls 215. In the illustration, casing 230 may be cemented to the walls 215 of the wellbore 210 by cement sheath 220. In the illustration, one or more additional conduits (e.g., intermediate casing, production casing, liners, etc.), shown here as casing 230 may also be disposed in the wellbore 210. As illustrated, there is a wellbore annulus 235 formed between the casing 230 and the walls 215 of the wellbore 210. One or more centralizers 240 may be attached to the casing 230, for example, to centralize the casing 230 in the wellbore 210 prior to and during the cementing operation. The cement slurry 200 may be pumped down the interior of the casing 230. The cement slurry 200 may be allowed to flow down the interior of the casing 230 through the casing shoe 245 at the bottom of the casing 230 and up around the casing 230 into the wellbore annulus 235. The cement slurry 200 may be allowed to set in the wellbore annulus 235, for example, to form a cement sheath that supports and positions the casing 230 in the wellbore 210. While not illustrated, other techniques may also be utilized for introduction of the cement slurry 200. By way of example, reverse circulation techniques may be used that include introducing the cement slurry 200 into the subterranean formation 205 by way of the wellbore annulus 235 instead of through the casing 230. As it is introduced, the cement slurry 200 may displace other fluids 250, such as drilling fluids and/or spacer fluids that may be present in the interior of the casing 230 and/or the wellbore annulus 235. While not illustrated, at least a portion of the displaced fluids 250 may exit the wellbore annulus 235 via a flow line and be deposited, for example, in one or more retention pits. A bottom plug 255 may be introduced into the wellbore 210 ahead of the cement slurry 200, for example, to separate the cement slurry 200 from the fluids 250 that may be inside the casing 230 prior to cementing. After the bottom plug 255 reaches the landing collar 280, a diaphragm or other suitable device should rupture to allow the cement slurry 200 through the bottom plug 255. The bottom plug 255 is shown on the landing collar 280. In the illustration, a top plug 285 may be introduced into the wellbore 210 behind the cement slurry 200. The top plug 260 may separate the cement slurry 200 from a displacement fluid 265 and also push the cement slurry 200 through the bottom plug 255.

The following statements may describe certain embodiments of the disclosure but should be read to be limiting to any particular embodiment.

Statement 1. A method of cementing comprising: measuring a feeding rate of water and a feeding rate of cement blend into a cement blender; calculating a cement retarder feeding rate and/or an accelerator feeding rate using a thickening time model, wherein the thickening time model uses at least a thickening time requirement, the feeding rate of water, and the feeding rate of cement blend, to calculate the cement retarder feeding rate and/or the accelerator feeding rate; introducing a cement retarder at the cement retarder feeding rate and/or an accelerator at the accelerator feeding rate into the cement blender; mixing at least the water, cement blend, and at least one of the cement retarder and/or the accelerator in the cement blender to provide a cement slurry; and placing the cement slurry in a wellbore.

Statement 2. The method of statement 1 wherein thickening time model comprises the following equation:

$$1 = \int_0^t \frac{dt}{TT(T_{dh}(t), P_{dh}(t), \rho_s(t), C_{bl}(t), [A](t))}$$

where thickening time (TT) is a function of time (t), $T_{dh}(t)$ is a temperature downhole as a function of time, $P_{dh}(t)$ is a pressure in the wellbore as a function of time, $\rho_s(t)$ is density of the cement slurry as a function of time, $C_{bl}(t)$ is a composition of the cement blend as a function of time, and $[A](t)$ is a concentration of the cement retarder and/or the accelerator as a function of time.

Statement 3. The method of statement 2 wherein:

$$TT(T_{dh}(t), P_{dh}(t), \rho_s(t), C_{bl}(t), [A](t)) = f_1(T) * f_2(P) * f_3([A]) * f_4\left(\frac{W}{C}\right) * f_5(C_{bl})$$

where f1, f2, f3, f4, and f5 are transcendental equations selected from power law, exponential, logarithmic, trigonometric, or a combination thereof, W is a mass fraction of the water in the cement slurry, and C is a mass fraction of the cement blend in the cement slurry.

Statement 4. The method of statement 2 wherein:

$$TT(T_{dh}(t), P_{dh}(t), \rho_s(t), C_{bl}(t), [A](t)) = TT_0 \exp\left(-\frac{E}{R}\left(\frac{1}{T_{ref}} - \frac{1}{T(t)}\right)\right) \exp\left(\frac{-VP(t)}{RT_{ref}}\right) \exp(\alpha[A](t)) \left(\frac{W(t)}{C_{bl}(t)}\right)^n$$

where $TT_0$ is characteristic thickening time at a reference temperature, E is activation energy, R is the universal gas constant, $T_{ref}$ is a reference temperature, T(t) is temperature as a function of time, V is activation volume, P(t) is a pressure in the wellbore as a function of time, α is a potency of the cement retarder and/or accelerator, [A](t) is a concentration of the cement retarder and/or accelerator as a function of time, W(t) is a mass fraction of the water in the cement slurry as a function of time, $C_{bl}(t)$ is a mass fraction of the cement blend in the cement slurry as a function of time, and n is a constant indicating sensitivity of thickening time to amount of the water.

Statement 5. The method of any of statements 1-4 wherein the cement retarder is selected from phosphonic acid derivatives, lignosulfonates, salts, organic acids, cellulose derivatives, synthetic co- or ter-polymers comprising sulfonate and carboxylic acid groups, borate compounds, and combinations thereof and wherein the accelerator is selected from aluminum sulfate, alums, calcium chloride, calcium nitrate, calcium nitrite, calcium formate, calcium sulphoaluminate, calcium sulfate, gypsum-hemihydrate, sodium aluminate, sodium carbonate, sodium chloride, sodium silicate, sodium sulfate, ferric chloride, and combinations thereof.

Statement 6. The method of any of statements 1-5 wherein the cement retarder feeding rate and/or accelerator feeding rate changes with time to meet or exceed the thickening time requirement.

Statement 7. The method of any of statements 1-6 wherein the cement retarder feeding rate comprises two or more cement retarders with disparate chemical identities and/or wherein the cement retarder feeding rate comprises two or more cement retarders with disparate chemical identities.

Statement 8. A method of preparing cement comprising: calculating a cement retarder feeding rate and/or an accelerator feeding rate using a thickening time model, wherein the thickening time model uses at least a thickening time requirement, a feeding rate of water, and a feeding rate of cement blend, to calculate the cement retarder feeding rate and/or the accelerator feeding rate; mixing a cement slurry by combining a cement blend at the feeding rate of cement blend, water at the feeding rate of water, and a cement retarder at the cement retarder feeding rate and/or an accelerator at the accelerator feeding rate.

Statement 9. The method of statement 8 wherein thickening time model comprises the following equation:

$$1 = \int_0^t \frac{dt}{TT(T_{dh}(t), P_{dh}(t), \rho_s(t), C_{bl}(t), [A](t))}$$

where thickening time (TT) is a function of time (t), $T_{dh}(t)$ is a temperature downhole as a function of time, $P_{dh}(t)$ is a pressure in a wellbore as a function of time, $\rho_s(t)$ is density of the cement slurry as a function of time, $C_{bl}(t)$ is a composition of the cement blend as a function of time, and $[A](t)$ is a concentration of the cement retarder and/or the accelerator as a function of time.

Statement 10. The method of statement 9 wherein:

$$TT(T_{dh}(t), P_{dh}(t), \rho_s(t), C_{bl}(t), [A](t)) =$$
$$TT_0 \exp\left(-\frac{E}{R}\left(\frac{1}{T_{ref}} - \frac{1}{T(t)}\right)\right) \exp\left(\frac{-VP(t)}{RT_{ref}}\right) \exp(\alpha[A](t)) \left(\frac{W(t)}{C_{bl}(t)}\right)^n$$

where $TT_0$ is characteristic thickening time at a reference temperature, E is activation energy, R is the universal gas constant, $T_{ref}$ is a reference temperature, T(t) is temperature as a function of time, V is activation volume, P(t) is a pressure in a wellbore as a function of time, $\alpha$ is a potency of the cement retarder and/or the accelerator, $[A](t)$ is a concentration of the retarder and/or accelerator as a function of time, W(t) is a mass fraction of the water in the cement slurry as a function of time, $C_{bl}(t)$ is a mass fraction of the cement blend in the cement slurry as a function of time, and n is a constant indicating sensitivity of thickening time to amount of water.

Statement 11. The method of any of statements 8-10 wherein the cement retarder is selected from phosphonic acid derivatives, lignosulfonates, salts, organic acids, cellulose derivatives, synthetic co- or ter-polymers comprising sulfonate and carboxylic acid groups, borate compounds, and combinations thereof.

Statement 12. The method of any of statements 8-11 wherein the cement retarder is selected from phosphonic acid derivatives, lignosulfonates, salts, organic acids, cellulose derivatives, synthetic co- or ter-polymers comprising sulfonate and carboxylic acid groups, borate compounds, and combinations thereof and wherein the accelerator is selected from aluminum sulfate, alums, calcium chloride, calcium nitrate, calcium nitrite, calcium formate, calcium sulphoaluminate, calcium sulfate, gypsum-hemihydrate, sodium aluminate, sodium carbonate, sodium chloride, sodium silicate, sodium sulfate, ferric chloride, and combinations thereof.

Statement 13. A system comprising: a cement blender fluidically coupled to a wellbore; a first flow meter configured to measure a flow rate of water to the cement blender; a second flow meter configured to measure a flow rate of cement blend to the cement blender; and a control system configured to: calculate a cement additive flow rate using a thickening time model, wherein the thickening time model uses at least a thickening time requirement, the flow rate of water to the cement blender, and the flow rate of cement blend to the cement blender to calculate the cement additive flow rate.

Statement 14. The system of statement 13 wherein the control system is further configured to cause a cement additive system to add a cement additive to the cement blender at the cement additive flow rate.

Statement 15. The system of any of statements 13-14 wherein the cement additive is a cement retarder and/or a cement accelerator.

Statement 16. The system of any of statements 13-15 wherein the thickening time requirement is time-dependent.

Statement 17. The system of any of statements 13-16 wherein thickening time model comprises the following equation:

$$1 = \int_0^t \frac{dt}{TT(T_{dh}(t), P_{dh}(t), \rho_s(t), C_{bl}(t), [A](t))}$$

where thickening time (TT) is a function of time (t), $T_{dh}(t)$ is a temperature downhole as a function of time, $P_{dh}(t)$ is a pressure in the wellbore as a function of time, $\rho_s(t)$ is density of a cement slurry as a function of time, $C_{bl}(t)$ is a composition of the cement blend as a function of time, and $[A](t)$ is a concentration of the cement retarder and/or the accelerator as a function of time.

Statement 18. The system of any of statements 13-17 wherein:

$$TT(T_{dh}(t), P_{dh}(t), \rho_s(t), C_{bl}(t), [A](t)) =$$
$$TT_0 \exp\left(-\frac{E}{R}\left(\frac{1}{T_{ref}} - \frac{1}{T(t)}\right)\right) \exp\left(\frac{-VP(t)}{RT_{ref}}\right) \exp(\alpha[A](t)) \left(\frac{W(t)}{C_{bl}(t)}\right)^n$$

where $TT_0$ is characteristic thickening time at a reference temperature, E is activation energy, R is the universal gas constant, $T_{ref}$ is a reference temperature, T(t) is temperature as a function of time, V is activation volume, P(t) is a pressure in the wellbore as a function of time, $\alpha$ is a potency of the cement retarder and/or the accelerator, $[A](t)$ is a concentration of the retarder and/or accelerator as a function of time, W(t) is a mass fraction of the water in a cement slurry as a function of time, $C_{bl}(t)$ is a mass fraction of cement blend in the cement slurry as a function of time, and n is a constant indicating sensitivity of thickening time to amount of the water.

Statement 19. The system of any of statements 13-18 wherein the cement additive flow rate changes with time to meet or exceed the thickening time requirement.

Statement 20. The system of any of statements 13-19 wherein the cement additive flow rate comprises two or more cement additives with disparate chemical identities.

Example 1

Figure 3:
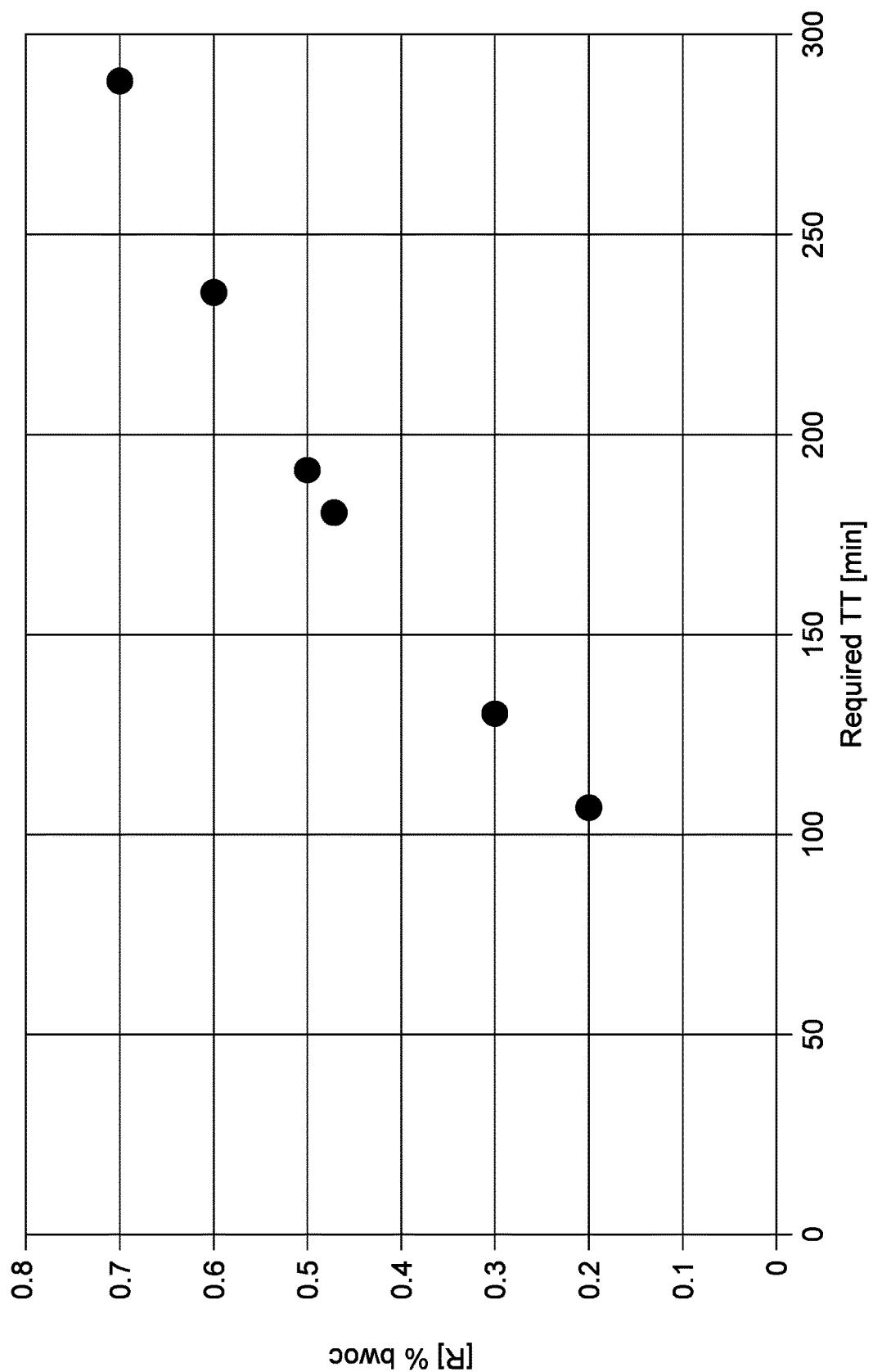
FIG. 3 is a graph of the thickening time versus retarder concentration.

Example methods of using the thickening time models will now be discussed. In this example, wellbore temperature and pressure are assumed to be constant, which is in-line with the methods of using consistometers to develop cement slurries. Table 1 list model parameters used in this example for a simple Portland cement composition without additional supplementary cementitious materials. Equation 4 was used to calculate a concentration of retarder versus thickening time for the slurry. FIG. 3 is a graph of the thickening time versus retarder concentration calculated. It can be observed from FIG. 3 that the predicted concentration of retarder required for longer thickening times increases with the thickening time requirement.

TABLE 1

| Parameter | Value | Units |
|---|---|---|
| TT0 | 300 | min |
| E/R | −2000 | 1/K |
| Tref | 322 | K |
| T | 355 | K |
| W/C | 0.56 | |
| n | 1.5 | |
| alpha | 2 | |
| V | −5.00E−09 | m^3 |
| Pressure | 2.07E+07 | Pa |

Example 2

Figure 4:
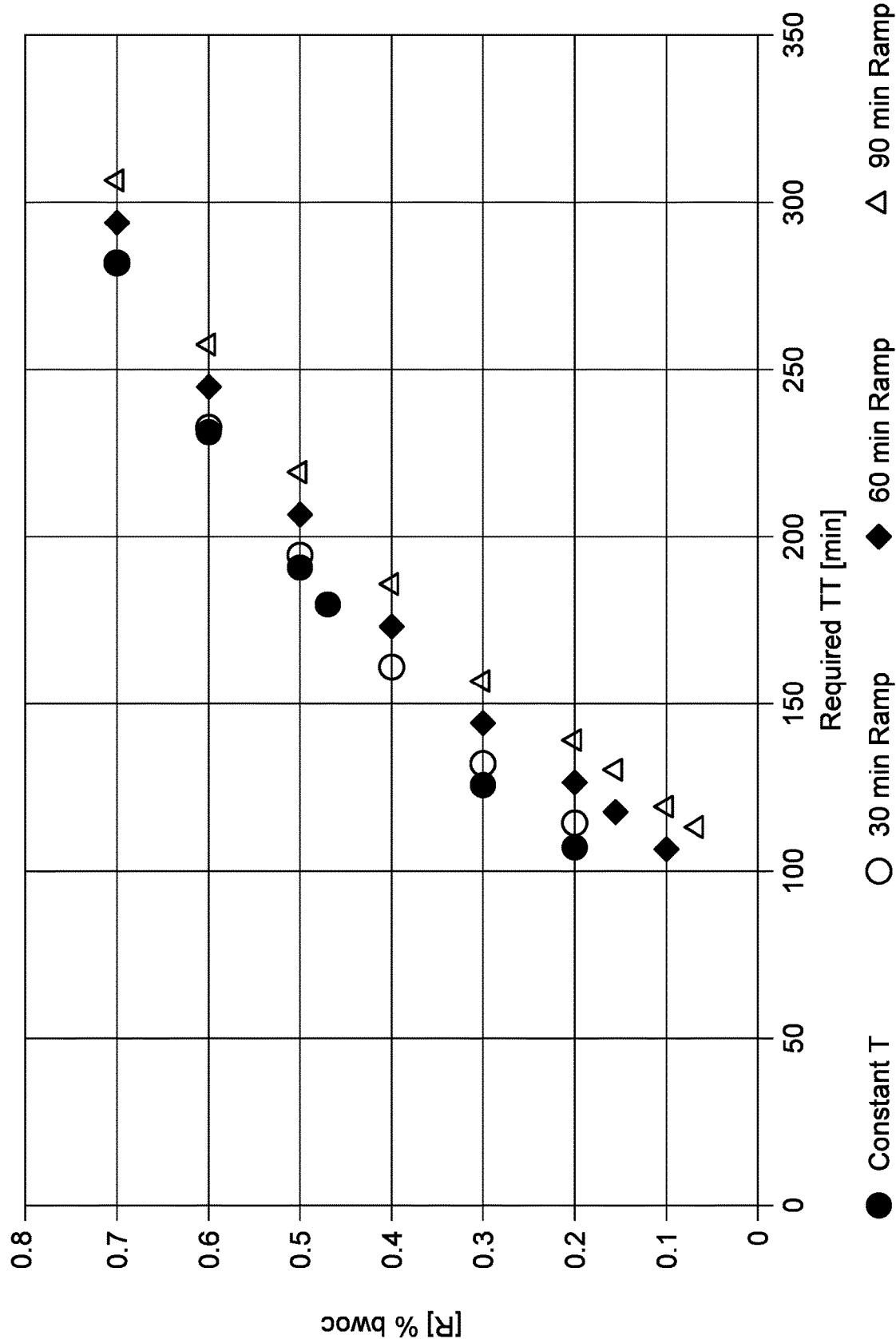
FIG. 4 is a graph of the thickening time versus retarder concentration.

In this example, the temperature is ramped from the ambient to the bottom hole circulating temperature over a period of 30, 60 and 90 minutes. Equation 4 insert and Table 1 were used to generate the results. The resulting concentration of retarder as a function of required thickening time is shown in FIG. 4. It can be observed that at higher ramp times for temperature, the required amount of retarder decreases. This is due to that the cement slurry at higher ramp times experiences a lower temperature for a longer time, which in turn slows the hydration reaction and increases the thickening time for a given cement slurry. It can be observed from FIG. 4 that a lower concentration of retarder may be used at higher ramp times.

Example 3

Figure 5:
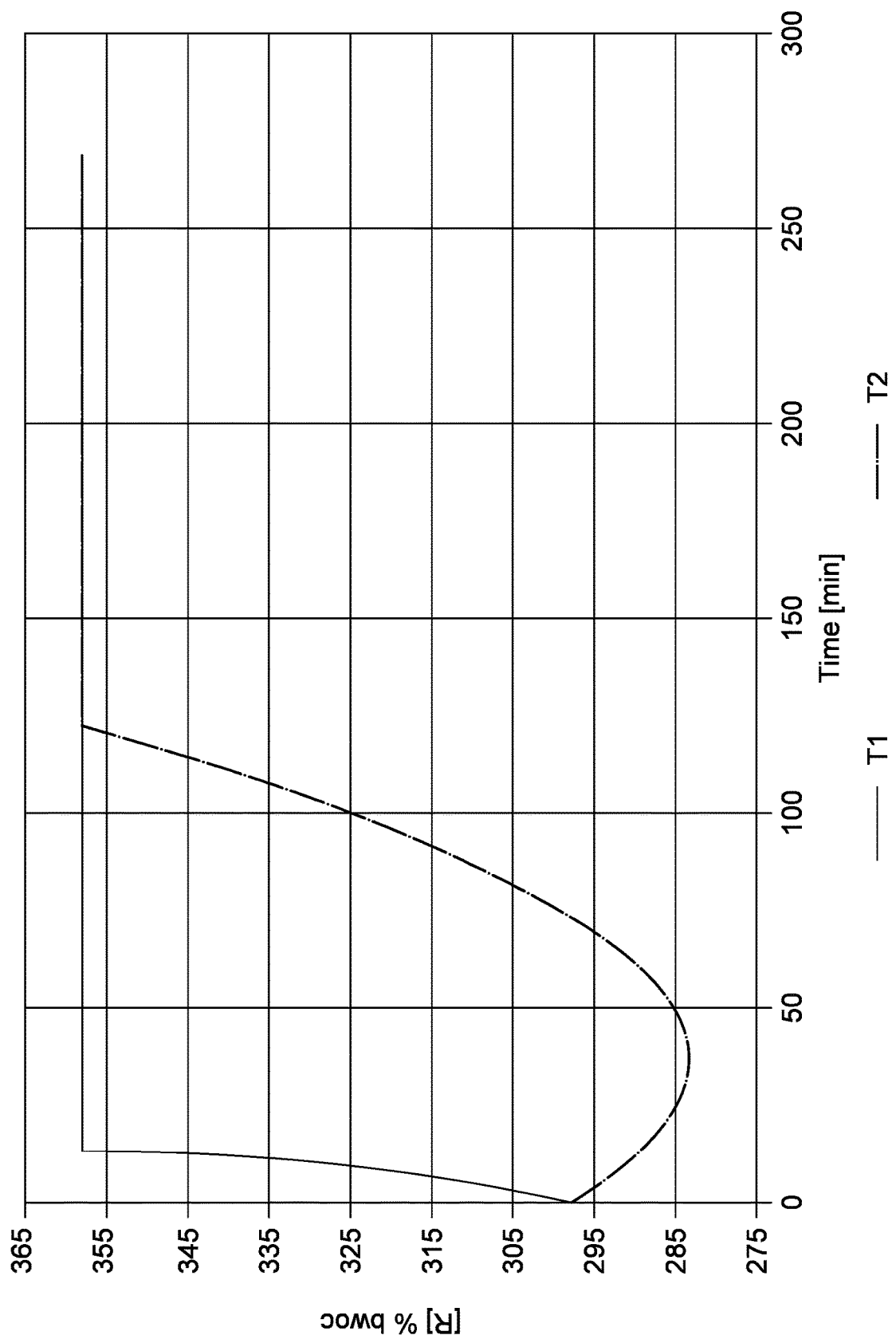
FIG. 5 is a graph a wellbore temperature profile.
Figure 6:
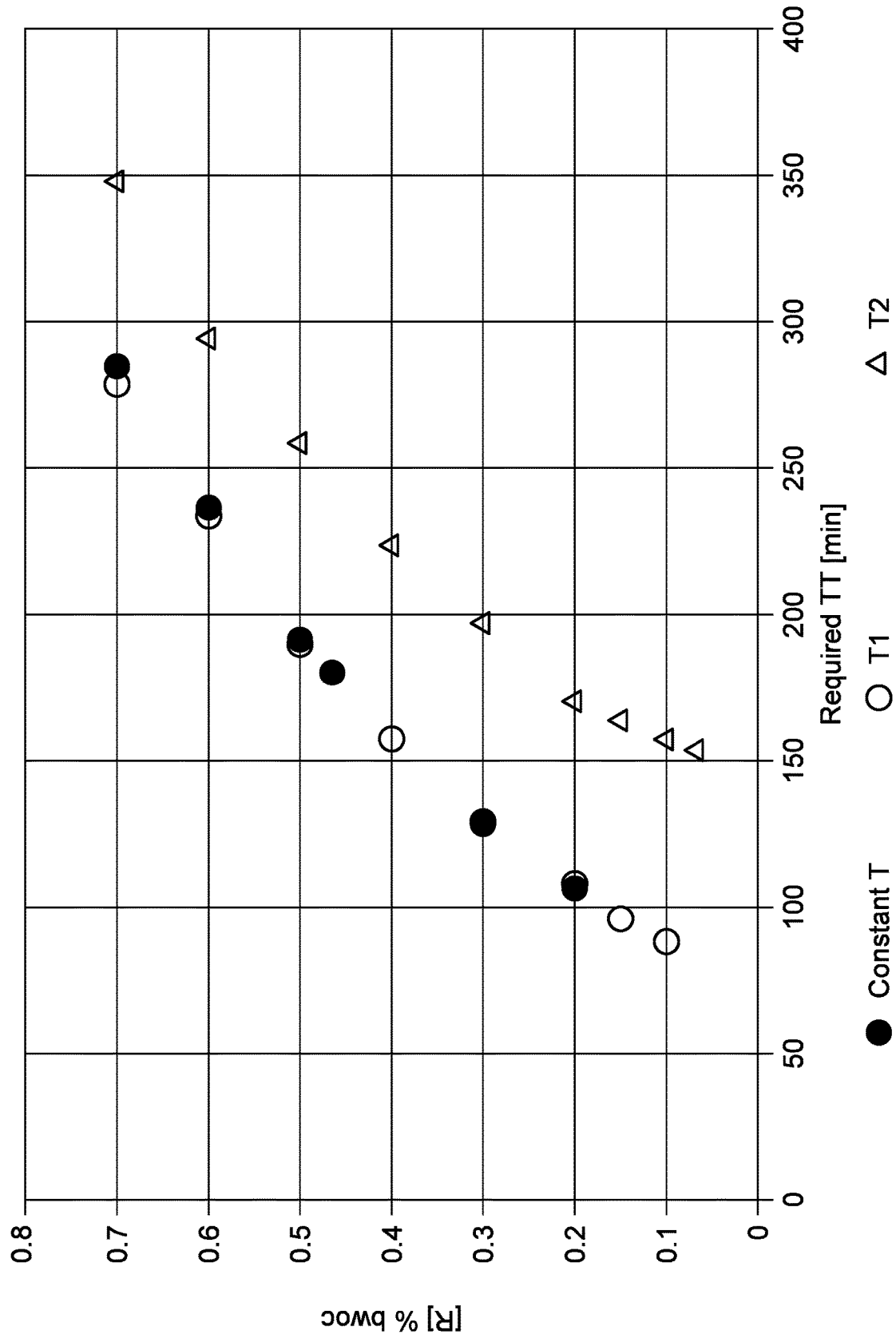
FIG. 6 is a graph of the thickening time versus retarder concentration.

In this example, a more realistic temperature profile for the wellbore is selected. FIG. 5 shows two temperature profiles that may be experienced by a cement slurry. Equation 4 insert and Table 1 were used to generate the results. FIG. 6 is a plot of thickening time to retarder concentration for the temperature profiles of FIG. 5. It can be observed that temperature profile T2 requires a smaller concentration of retarder than temperature profile T1 due to the ramp rate.

The disclosed cement compositions and associated methods may directly or indirectly affect any pumping systems, which representatively includes any conduits, pipelines, trucks, tubulars, and/or pipes which may be coupled to the pump and/or any pumping systems and may be used to fluidically convey the cement compositions downhole, any pumps, compressors, or motors (e.g., topside or downhole) used to drive the cement compositions into motion, any valves or related joints used to regulate the pressure or flow rate of the cement compositions, and any sensors (i.e., pressure, temperature, flow rate, etc.), gauges, and/or combinations thereof, and the like. The cement compositions may also directly or indirectly affect any mixing hoppers and retention pits and their assorted variations.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of cementing comprising:
measuring a feeding rate of water and a feeding rate of cement blend into a cement blender;
inputting the measured feeding rate of water and the measured feeding rate of cement blend into a thickening time model together with at least a thickening time requirement to calculate a cement retarder feeding rate and/or an accelerator feeding rate, wherein the thickening time model comprises an equation relating the thickening time as a function of time to a temperature downhole as a function of time, a pressure in the wellbore as a function of time, a density of the cement slurry as a function of time, a composition of the cement blend as a function of time, and a concentration of a cement retarder and/or an accelerator as a function of time;
introducing the cement retarder at the cement retarder feeding rate and/or the accelerator at the accelerator feeding rate into the cement blender;
mixing at least the water, cement blend, and at least one of the cement retarders and/or the accelerator in the cement blender to provide a cement slurry; and
placing the cement slurry in a wellbore.

2. The method of claim 1 wherein thickening time model comprises the following equation:

$$1 = \int_0^t \frac{dt}{TT(T_{dh}(t), P_{dh}(t), \rho_s(t), C_{bl}(t), [A](t))}$$

where thickening time (TT) is a function of time (t), $T_{dh}(t)$ is a temperature downhole as a function of time, $P_{dh}(t)$ is a pressure in the wellbore as a function of time, $\rho_s(t)$ is density of the cement slurry as a function of time, $C_{bl}(t)$ is a composition of the cement blend as a function of time, and $[A](t)$ is a concentration of the cement retarder and/or the accelerator as a function of time.

3. The method of claim 2 wherein:

$$TT(T_{dh}(t), P_{dh}(t), \rho_s(t), C_{bl}(t), [A](t)) = f_1(T) * f_2(P) * f_3([A]) * f_4\left(\frac{W}{C}\right) * f_5(C_{bl})$$

where $f_1$, $f_2$, $f_3$, $f_4$, and $f_5$ are transcendental equations selected from power law, exponential, logarithmic, trigonometric, or a combination thereof, W is a mass fraction of the water in the cement slurry, and C is a mass fraction of the cement blend in the cement slurry.

4. The method of claim 2 wherein:

$$TT(T_{dh}(t), P_{dh}(t), \rho_s(t), C_{bl}(t), [A](t)) = TT_0 \exp\left(-\frac{E}{R}\left(\frac{1}{T_{ref}} - \frac{1}{T(t)}\right)\right) \exp\left(\frac{-VP(t)}{RT_{ref}}\right) \exp(\alpha[A](t)) \left(\frac{W(t)}{C_{bl}(t)}\right)^n$$

where $TT_0$ is characteristic thickening time at a reference temperature, E is activation energy, R is the universal gas constant, $T_{ref}$ is a reference temperature, T(t) is temperature as a function of time, V is activation volume, P(t) is a pressure in the wellbore as a function of time, $\alpha$ is a potency of the cement retarder and/or accelerator, [A](t) is a concentration of the cement retarder and/or accelerator as a function of time, W(t) is a mass fraction of the water in the cement slurry as a function of time, $C_{bl}(t)$ is a mass fraction of the cement blend in the cement slurry as a function of time, and n is a constant indicating sensitivity of thickening time to amount of the water.

5. The method of claim 1 wherein the cement retarder is selected from phosphonic acid derivatives, lignosulfonates, salts, organic acids, cellulose derivatives, synthetic co- or ter-polymers comprising sulfonate and carboxylic acid groups, borate compounds, and combinations thereof and wherein the accelerator is selected from aluminum sulfate, alums, calcium chloride, calcium nitrate, calcium nitrite, calcium formate, calcium sulphoaluminate, calcium sulfate, gypsum-hemihydrate, sodium aluminate, sodium carbonate, sodium chloride, sodium silicate, sodium sulfate, ferric chloride, and combinations thereof.

6. The method of claim 1 wherein the cement retarder feeding rate and/or accelerator feeding rate changes with time to meet or exceed the thickening time requirement.

7. The method of claim 1 wherein the cement retarder feeding rate comprises two or more cement retarders with disparate chemical identities and/or wherein the cement retarder feeding rate comprises two or more cement retarders with disparate chemical identities.

8. A method of preparing cement comprising:
inputting into a thickening time model, a thickening time requirement, a feeding rate of water, and a feeding rate of cement blend, and calculating, using the thickening time model, a cement retarder feeding rate and/or an accelerator feeding rate, wherein the thickening time model comprises an equation relating the thickening time as a function of time to a temperature downhole as a function of time, a pressure in the wellbore as a function of time, a density of the cement slurry as a function of time, a composition of the cement blend as a function of time, and a concentration of a cement retarder and/or an accelerator as a function of time;
mixing a cement slurry by combining a cement blend at the feeding rate of cement blend, water at the feeding rate of water, and a cement retarder at the cement retarder feeding rate and/or an accelerator at the accelerator feeding rate.

9. The method of claim 8 wherein the thickening time model comprises the following equation:

$$1 = \int_0^t \frac{dt}{TT(T_{dh}(t), P_{dh}(t), \rho_s(t), C_{bl}(t), [A](t))}$$

where thickening time (TT) is a function of time (t), $T_{dh}(t)$ is a temperature downhole as a function of time, $P_{dh}(t)$ is a pressure in a wellbore as a function of time, $\rho_s(t)$ is density of the cement slurry as a function of time, $C_{bl}(t)$ is a composition of the cement blend as a function of time, and $[A](t)$ is a concentration of the cement retarder and/or the accelerator as a function of time.

10. The method of claim 9 wherein:

$$TT(T_{dh}(t), P_{dh}(t), \rho_s(t), C_{bl}(t), [A](t)) = TT_0 \exp\left(-\frac{E}{R}\left(\frac{1}{T_{ref}} - \frac{1}{T(t)}\right)\right) \exp\left(\frac{-VP(t)}{RT_{ref}}\right) \exp(\alpha[A](t)) \left(\frac{W(t)}{C_{bl}(t)}\right)^n$$

where $TT_0$ is characteristic thickening time at a reference temperature, E is activation energy, R is the universal gas constant, $T_{ref}$ is a reference temperature, T(t) is temperature as a function of time, V is activation volume, P(t) is a pressure in a wellbore as a function of time, $\alpha$ is a potency of the cement retarder and/or the accelerator, [A](t) is a concentration of the retarder and/or accelerator as a function of time, W(t) is a mass fraction of the water in the cement slurry as a function of time, $C_{bl}(t)$ is a mass fraction of the cement blend in the cement slurry as a function of time, and n is a constant indicating sensitivity of thickening time to amount of water.

11. The method of claim 8 wherein the cement retarder is selected from phosphonic acid derivatives, lignosulfonates, salts, organic acids, cellulose derivatives, synthetic co- or ter-polymers comprising sulfonate and carboxylic acid groups, borate compounds, and combinations thereof.

12. The method of claim 8 wherein the accelerator is selected from aluminum sulfate, alums, calcium chloride, calcium nitrate, calcium nitrite, calcium formate, calcium sulphoaluminate, calcium sulfate, gypsum-hemihydrate, sodium aluminate, sodium carbonate, sodium chloride, sodium silicate, sodium sulfate, ferric chloride, and combinations thereof.

13. A system comprising:
a cement blender fluidically coupled to a wellbore;
a first flow meter configured to measure a flow rate of water to the cement blender;

a second flow meter configured to measure a flow rate of cement blend to the cement blender; and a control system configured to:

inputting the measured flow rate of water and the measured flow rate of cement blend into a thickening time model together with at least a thickening time requirement to calculate a cement retarder feeding rate and/or an accelerator feeding rate, wherein the thickening time model comprises an equation relating the thickening time as a function of time to a temperature downhole as a function of time, a pressure in the wellbore as a function of time, a density of the cement slurry as a function of time, a composition of the cement blend as a function of time, and a concentration of a cement retarder and/or an accelerator as a function of time.

14. The system of claim 13 wherein the control system is further configured to cause a cement additive system to add a cement additive to the cement blender at a cement additive flow rate.

15. The system of claim 14 wherein the cement additive is a cement retarder and/or a cement accelerator.

16. The system of claim 14 wherein the cement additive flow rate changes with time to meet or exceed the thickening time requirement.

17. The system of claim 14 wherein the cement additive flow rate comprises two or more cement additives with disparate chemical identities.

18. The system of claim 13 wherein the thickening time requirement is time-dependent.

19. The system of claim 13 wherein the thickening time model comprises the following equation:

$$1 = \int_0^\tau \frac{dt}{TT(T_{dh}(t), P_{dh}(t), \rho_s(t), C_{bl}(t), [A](t))}$$

where thickening time (TT) is a function of time (t), $T_{dh}(t)$ is a temperature downhole as a function of time, $P_{dh}(t)$ is a pressure in the wellbore as a function of time, $\rho_s(t)$ is density of a cement slurry as a function of time, $C_{bl}(t)$ is a composition of the cement blend as a function of time, and $[A](t)$ is a concentration of the cement retarder and/or the accelerator as a function of time.

20. The system of claim 13 wherein:

$$TT(T_{dh}(t), P_{dh}(t), \rho_s(t), C_{bl}(t), [A](t)) = TT_0 \exp\left(-\frac{E}{R}\left(\frac{1}{T_{ref}} - \frac{1}{T(t)}\right)\right) \exp\left(\frac{-VP(t)}{RT_{ref}}\right) \exp(\alpha[A](t)) \left(\frac{W(t)}{C_{bl}(t)}\right)^n$$

where $TT_0$ is characteristic thickening time at a reference temperature, E is activation energy, R is the universal gas constant, $T_{ref}$ is a reference temperature, T(t) is temperature as a function of time, V is activation volume, P(t) is a pressure in the wellbore as a function of time, α is a potency of the cement retarder and/or the accelerator, [A](t) is a concentration of the retarder and/or accelerator as a function of time, W(t) is a mass fraction of the water in a cement slurry as a function of time, $C_{bl}(t)$ is a mass fraction of cement blend in the cement slurry as a function of time, and n is a constant indicating sensitivity of thickening time to amount of the water.

* * * * *